US011494560B1

(12) United States Patent
Meisner

(10) Patent No.: US 11,494,560 B1
(45) Date of Patent: Nov. 8, 2022

(54) SYSTEM AND METHODOLOGY FOR COMPUTER-FACILITATED DEVELOPMENT OF READING COMPREHENSION TEST ITEMS THROUGH PASSAGE MAPPING

(71) Applicant: ACT, INC., Iowa City, IA (US)

(72) Inventor: Richard D. Meisner, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 541 days.

(21) Appl. No.: 16/777,379

(22) Filed: Jan. 30, 2020

(51) Int. Cl.
*G06F 40/284* (2020.01)
*G06F 40/44* (2020.01)
*G06F 3/04842* (2022.01)
*G06N 20/00* (2019.01)
*G09B 17/00* (2006.01)

(52) U.S. Cl.
CPC ........ *G06F 40/284* (2020.01); *G06F 3/04842* (2013.01); *G06F 40/44* (2020.01); *G06N 20/00* (2019.01); *G09B 17/003* (2013.01)

(58) Field of Classification Search
None
See application file for complete search history.

(56) References Cited

U.S. PATENT DOCUMENTS

| | | | | |
|---|---|---|---|---|
| 6,112,168 A * | 8/2000 | Corston | ................ | G06F 40/253 704/9 |
| 7,430,505 B1 * | 9/2008 | Horvitz | .................. | G06F 40/35 704/7 |
| 9,043,197 B1 * | 5/2015 | Pasca | .................... | G06F 40/284 704/10 |
| 9,495,648 B1 * | 11/2016 | Boyer | .................... | G06N 20/00 |
| 9,536,439 B1 * | 1/2017 | Goldstein | ............... | G09B 7/00 |
| 2006/0009966 A1 * | 1/2006 | Johnson | ............... | G06F 40/205 704/10 |
| 2006/0106595 A1 * | 5/2006 | Brockett | ................. | G06F 40/45 704/9 |
| 2009/0024606 A1 * | 1/2009 | Schilit | .................. | G06F 40/134 707/999.005 |
| 2010/0273138 A1 * | 10/2010 | Edmonds | ................ | G09B 3/00 434/322 |
| 2011/0045452 A1 * | 2/2011 | Bejar | ...................... | G09B 7/04 434/362 |

(Continued)

OTHER PUBLICATIONS

Ramesh, R., et al., "Semi-Automatic Generation of Metadata for Items in a Question Repository", 2014, IEEE (Year: 2014).*

(Continued)

*Primary Examiner* — Stella Higgs
(74) *Attorney, Agent, or Firm* — Sheppard, Mullin, Richter & Hampton LLP

(57) ABSTRACT

The present disclosure provides systems and methods for providing interface rendering of passages for test item generation. Methods and systems can utilize natural language processing (NLP) and machine learning (ML) models to analyze passages that were provided in historical testing environments (e.g., first passage), determine one or more similar search strings that are also found in a current passage (e.g., second passage), and provide the first and second passages to a user interface of a user device. On the display, the search string in the historical and current passages may be highlighted at the user interface to identify the similarities.

16 Claims, 9 Drawing Sheets

(56) References Cited

U.S. PATENT DOCUMENTS

| | | | |
|---|---|---|---|
| 2011/0123967 A1* | 5/2011 | Perronnin | G09B 7/02 |
| | | | 434/362 |
| 2011/0257961 A1* | 10/2011 | Tinkler | G09B 7/06 |
| | | | 434/156 |
| 2014/0040181 A1* | 2/2014 | Kuznetsov | G06F 40/268 |
| | | | 706/55 |
| 2015/0169547 A1* | 6/2015 | Reiter | G06F 40/131 |
| | | | 704/9 |
| 2015/0324351 A1* | 11/2015 | Sripada | G06Q 10/06 |
| | | | 704/9 |
| 2016/0035237 A1* | 2/2016 | Nealon | G09B 7/02 |
| | | | 434/353 |
| 2016/0042198 A1* | 2/2016 | Kapoor | G06F 21/6254 |
| | | | 726/26 |
| 2016/0063879 A1* | 3/2016 | Vanderwende | G06F 16/3329 |
| | | | 434/322 |
| 2017/0169717 A1* | 6/2017 | Allen | G09B 7/08 |
| 2018/0130375 A1* | 5/2018 | Booth | G09B 5/08 |
| 2018/0218627 A1* | 8/2018 | Smith Lewis | G09B 5/125 |
| 2018/0260472 A1* | 9/2018 | Kelsey | G09B 7/02 |
| 2019/0304320 A1* | 10/2019 | Apokatanidis | G06F 40/289 |

OTHER PUBLICATIONS

Rao, D., et al., "Automatic Multiple Choice Question Generation from Text: A Survey", 2018, IEEE (Year: 2018).*

* cited by examiner

SYSTEM AND METHODOLOGY FOR COMPUTER-FACILITATED DEVELOPMENT OF READING COMPREHENSION TEST ITEMS THROUGH PASSAGE MAPPING

TECHNICAL FIELD

The disclosed technology relates generally to electronic testing item development, and more particularly to systems and methods for an interface rendering of passages for reading assessment test item development based on the detection and recognition of semantic and linguistic properties found in the passage.

BACKGROUND

Original text-based content for testing and educational purposes is traditionally identified and generated in a manual and laborious manner. Test developers may review pre-existing text-based content (usually referred to as "passages") and select portions ripe for generating test items (e.g., questions and answers, or other test/assessment items). The vast number and volume of pre-existing text-based content, with varying difficulty and complexity, can make selecting portions ripe for generating test items difficult with traditional processes. Better systems and methods are needed.

BRIEF SUMMARY OF EMBODIMENTS

Traditionally, a content specialist develops items based on these passages. For example, the content specialist reads the passage to identify particular words, phrases, or groups of sentences (e.g., search strings) that could be included in future test items. This is referred to as "passage-mapping." It tends to be time-consuming, subjective, imperfect, and inconsistent, with different content specialists finding or overlooking different testable item opportunities. Computer systems are historically incapable of automatic passage mapping and assisting in generating passage-based question and answer items, including question and answer items for reading comprehension testing, mostly due to the vast plethora of content of broad topics, unidentified search strings in previous passages, and of varying degree of difficulty.

The present disclosure provides systems and methods for providing interface rendering of passages for test item generation. The present disclosure can utilize natural language processing (NLP) and machine learning (ML) models to analyze passages that were provided in historical testing environments (e.g., first passage), determine one or more similar search strings that are also found in a current passage (e.g., second passage), and provide the first and second passages to a user interface of a user device. On the display, the search string in the historical and current passages may be highlighted at the user interface to identify the similarities. The search string may also be used to help generate new test items for the current passage. The historical and current passages may correspond with search strings that share similarities between these two passages. The analysis can help generate similar test questions in a future test, where the future test would include the current passage and the new test questions.

As a sample illustration, an input passage may include one or more search strings, including, for example, a search string corresponding with a causal relation ("as a result of"), a comparative relation ("better than"), or other information.

The system disclosed herein may search for one or more of these input passages provided in historical testing environments to find search strings that are similar to search strings in a current passage. Suggested input passages may be provided and displayed. The input passages can include one or more annotations that highlight a search string that may be modeled to generate a new passage. The annotation can be associated with a content taxonomy code. The annotation can comprise an overlay or highlighting of at least a portion of the passage.

Method and systems described herein can include receiving, by an item evaluation server, an input passage. The input passage may be a corpus of text and/or comprise one or more search strings that correspond with a plurality of textual patterns. One or more of these textual patterns can include skill-specific language cues.

Method and systems described herein can include providing for display the input passage. The input passage may include one or more search strings and/or corpus of text. At least a portion of the input passage can be displayed at a Graphical User Interface (GUI).

Method and systems described herein can include tokenizing and/or searching the input passage to determine one or more skill-specific textual patterns. The input passage may include the skill-specific textual pattern, and thus be a relevant and/or "testable" to the input passage. In some examples, one or more of these textual patterns may be associated with a test skill. Text tokenizing and search can be performed upon activation of a first trigger. Passage tokenizing can include tokenizing the passage into words, sentences, and parts of speech.

Method and systems described herein can include providing a search query comprising one or more of the skill-specific textual patterns. The textual patterns can be searched in the input passage.

Method and systems described herein can include matching the skill-specific textual patterns with corresponding taxonomy codes and determining a stored item which includes the skill-specific textual pattern associated with the taxonomy code. The stored item may correspond with a generated test question corresponding with the passage. The taxonomy code can be related to or indicate, for example, a comparative relationship, causal relationship, argument, fact, opinion, reason, judgement, evidence, intent, or theme.

Method and systems described herein can include providing for display the input passage and corresponding one or more stored items that were provided with the input passage in the historical test environment. The stored item can be displayed in a second portion of the GUI. The stored item provided for display can include an overlay of at least a portion of the stored item to identify, for example, a search string or other relevant information for the test administrator. The overlay can be based on the taxonomy code and/or the skill-specific textual pattern.

Methods and systems described herein can include providing for display the input passage and/or current passage. The input passage can further include annotation associated with the taxonomy code. The annotation can include an overlay of at least a portion of the input passage based on the taxonomy code and/or the skill-specific textual pattern. Methods and systems can further include providing for display at least a portion of the input passage without the annotation of the input passage. Providing the input passage can commence upon activation of a second trigger. Activation of the second trigger can indicate a request to revert to the display of input passage.

Methods and systems described herein can include determining the stored item from the data store, based on a stored item attribute. The stored item attribute can be, for example, either of: a last test date, a question difficulty, a question discriminator, a theme, a scholastic area, or distractor.

Methods and systems described herein can implement a machine learning (ML) item evaluation model. The ML model may be trained using input passages and corresponding stored items for those input passages. The stored item may be determined by the trained machine learning item evaluation model based on the skill-specific textual pattern associated with the taxonomy code of the input passage, detection and recognition of semantic and linguistic properties, and/or weighted contributions of stored item attributes.

Methods and systems described herein can include, upon activation of the first trigger or another trigger, tokenizing, via the item evaluation server, the current passage to determine a theme of the current passage using, at least in part, a natural language processing engine of the item evaluation server. Moreover, methods and systems can determine the input passage and/or stored item from the data store based on the stored item having the same theme as the current passage.

Methods and systems described herein can include matching a skill-specific textual pattern of the current passage to a respective taxonomy code. The determined stored item can include one or more of the skill-specific textual patterns. Upon activation of a third trigger indicating a request to select a particular taxonomy code from the at least one taxonomy code, methods and systems described herein can provide for display at the first object of the GUI, the annotated current passage corresponding with the new test environment or the annotated input passage corresponding with the historical test environment. Moreover, systems and methods can provide for display at the second object the annotated stored item. The annotated stored item can be based on a user selected taxonomy code and/or the skill specific textual pattern. The user selected taxonomy code can be used to train the trained machine learning item evaluation model.

Methods and systems described herein can further include generating a test item for the current passage. The generated test item can be provided for display, including alongside the stored item. The generated test item can be based on a portion of the current passage which has a higher density of assigned taxonomy codes and a multiple choice item, each part of which is based on the corresponding portion of the current passage, a theme of the current passage, and the stored item.

Systems described herein can include a graphical user interface, a data store, and an item evaluation server. The item evaluation serve can further include a processor and a non-transitory computer readable medium with computer executable instructions embedded thereon. The computer executable instructions can be configured to cause the processor to execute the methods described herein.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the disclosure to the precise form disclosed. It should be understood that the disclosure can be practiced with modification and alteration, and that the disclosed technology be limited only by the claims and the equivalents thereof.

DETAILED DESCRIPTION OF THE EMBODIMENTS

The disclosure described in this document increases the efficiency of passage mapping by providing the content specialist with a systematic, computer-assisted approach. The disclosure described herein provide greater speed of identification of opportunities for generating test items based on a passage or large corpus, in any genre, style, and for any topic. The disclosure described herein can provide for identification of item opportunities that the content specialist would otherwise have missed.

Systems and methods described herein can provide improved displays for rendering passage highlighting, which can automatically and efficiently highlight language ripe for generating test items based on a taxonomy code. Improved displays described herein can scan/overlay displayed test items based on taxonomy code to increase computing efficiencies.

Systems and methods described herein can improve item display by highlighting passages and determining and rendering relevant stored test questions, which can allow for improved item performance, greater consistency between test cycles and quality standardization. Systems and methods described herein allow for processing of vast amount of historical item data, and computationally efficient, automatic determination and rendering of relevant past test items. Similarities between the tokenized passage section for basing generated test items, and the historical test items can be efficiently determined using data such as the taxonomy code. For example, search patterns for relevant new item opportunities can be based on items that have been historically provided in testing environment, and those stored items which are relevant to the passage for generating new test items can be determined and displayed. Systems and methods described herein can allow for consistency in testing because new test items can assess similar skills in similar ways as before, resulting in similarly successful item performance. Moreover, past unsuccessful items can be avoided and not suggested.

Figure 1A:
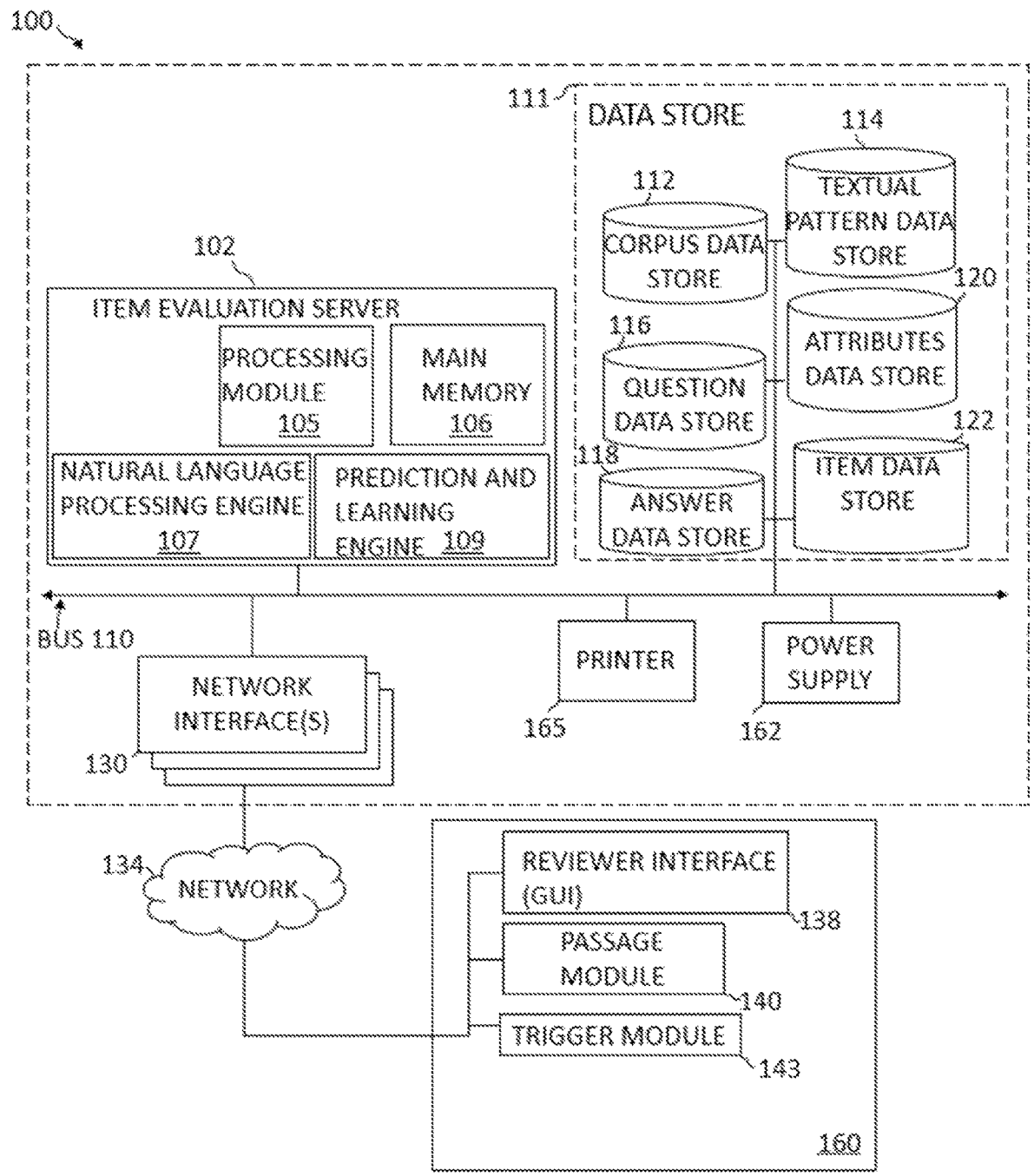
FIG. 1A illustrates an example system for item development.

FIG. 1A illustrates an example system for item development. System 100 can include item evaluation server 102. Item evaluation server 102 can include processing module 105. Processing module 105 may represent, for example, computing or processing capabilities found within desktop, laptop and notebook computers; hand-held computing devices (PDA's, smart phones, cell phones, palmtops, etc.); mainframes, supercomputers, workstations or servers; or any other type of computing devices as may be desirable or appropriate for this application or environment. Processing module 105 can also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability. Processing module 105 can be implemented using, for example, a microprocessor, controller, or other control logic.

Item evaluation server 102 can further include natural language and processing (NLP) engine 107 and/or prediction and learning engine 109. NLP engine 107 can perform detection and recognition of semantic and linguistic properties of language. Processing module 105 and/or engines 107, 109 can operate a machine learning based item evaluation model.

System 100 can further include data bus 110, although any communication medium can be used to facilitate interaction with other components of system 100 or to communicate externally.

System 100 for interface rendering of tokenized item development can include data store 111. Data associated with one or more operations of the present disclosure may be stored in data store 111. Data store 111 may be a local or a remote data store (or a combination thereof) and may additionally be configured to receive and/or forward some or all of the stored data relating to an operation of the present disclosure. Data in data store 111 may be organized as database items.

Data store 111 may take one or more of various forms, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive 912. As these examples illustrate, the storage media can include a computer usable storage medium having stored therein computer software (including for executing instructions for the item evaluation server 102) or data.

In alternative embodiments, data store 111 might include other similar instrumentalities for allowing computer programs or other instructions or data to be loaded into the item evaluation server 102 and/or the processing module 105. Such instrumentalities might include, for example, a fixed or removable storage unit and an interface (e.g. the reviewer interface 138). Examples of such storage units and interfaces can include a program cartridge and cartridge interface, a removable memory (for example, a flash memory or other removable memory engine) and memory slot, a PCMCIA slot and card, and other fixed or removable storage units and interfaces that allow software and data to be transferred from the data store 111 to the item evaluation server 102.

Data store 111 can include a plurality of data stores, including textual pattern data store 114, question (item "stem") data store 116, answer data store 118, multiple choice item data store (not shown, but can include stored items of question data store 116 and/or answer data store 118), attributes data store 120, and item data store 122.

Corpus data store 112 may include entire or partial corpora from varying topics. Corpus data store 112 can also include general or topic specific dictionaries.

Textual patterns in textual pattern data store 114 can be skill-specific language cues (for example as "search strings"). For example, textual patterns that allow for understanding comparative relationships can be search strings "is greater than" or "is like." Textual pattern data store 114 may also include taxonomy codes associated with the textual patterns. For example, a taxonomy code can be generated and assigned to the one or more textual patterns that are language cues for demonstrating comparative relationships. Each such taxonomy code for textual patterns indicating comprehension of a same or similar skill, can have the same portion of the taxonomy code.

Question data store 116 may include questions, sometimes referred to as item "stems." In some examples, the questions may be associated with answer options from answer data store 118 and/or attributes in attribute data store 120. Question items may be full questions, or be sentence fragments (question stems) wherein the remaining portion of the sentence may be found in the corresponding answer item.

Item data store 122 may include stored items provided in historical test environments, including for example question (stem) and answers, together with associated passages. Although called stored items, the data in item data store 122 is not limited to items or other content which have been previously tested.

Item evaluation server 102 might also include one or more memory engines, simply referred to herein as main memory 106. For example, random access memory (RAM) or other dynamic memory might be used for storing information and instructions to be executed by processing module 105. Main memory 106 might also be used for storing temporary variables or other intermediate information during execution of instructions to be executed by processing module 105. Item evaluation server 102 might likewise include a read only memory ("ROM") or other static storage device coupled to bus 110 for storing static information and instructions for processing module 105.

In some embodiments of the disclosure, item evaluation server 102 may be configured to execute any one or more of the protocols, processes, models, or operations of this disclosure, provide outputs for display on electronic device 160 and/or reviewer interface 138, and receive inputs from electronic device 160 and/or data store 111. In various other embodiments, server 102 may be configured to execute any one or more operations associated with developing test items electronically, or receiving material for developing test items, such as multiple choice items, electronically from paper material (e.g. via a scanner for scanning textual content, not shown), or cooperatively with one or more other electronic devices 160, computers, or workstations.

Network interface(s) 130 can facilitate communication with electronic device 160 on network 134 and the other components of system 100. Network interface(s) 130 can be used to allow software and data to be transferred between item evaluation server 102 and or data store 111, and one or more device(s) 160. Examples of network interfaces 130 might include a modem or softmodem, a standardized network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via network interface 130 might typically be carried on signals, which can be electronic, electromagnetic (which includes optical) or other signals capable of being exchanged by a given network interface 130. These signals might be provided to network interface 130 via bus 110.

Bus 110 might carry signals and might be implemented using a wired or wireless communication medium. Some examples of bus 110 might include a phone line, a cellular link, an RF link, an optical link, a network interface, a local or wide area network, and other wired or wireless communications channels. The network 134 may be the internet, a public switchable telephone network, a local area network, private wide area network, wireless network, or any of the like for communicating with system 100 and or device 160 of the present disclosure. Although network 134 is shown, it is understood that the disclosure is not limited to operation with a network, but rather, the disclosure may be practiced in any suitable electronic device (or multiple devices). Accordingly, network 134 is not meant to limit the disclosure in any respect.

Electronic device 160 may comprise reviewer interface 138, passage module 140, and trigger module 143. Device 160 can correspond with, for example, a phone, computer, terminal, and/or other system 100.

Reviewer interface 138 can be a graphical user interface (GUI). Reviewer interface 138 can facilitate receiving stored items and other user feedback, as well as displaying information to the user.

Passage module 140 can facilitate receiving and/or displaying passages containing text. Passage module 140 may transmit passages to item evaluation server 102 via network 134. Item evaluation server 102 can create new stored items or update existing stored items in item data store 122 using information from one or more passages received from passage module 140.

Trigger module 143 can facilitate receiving and/or producing triggers. The triggers may be generated by the reviewer/user of device 160, item evaluation server 102, or between other systems.

System 100 may further include power supply 162. Additionally, a printer 165 may be configured to output the content from one or more operations of the disclosure, including test items, passages, annotated passages, portions of passages, or items.

Figure 1B:
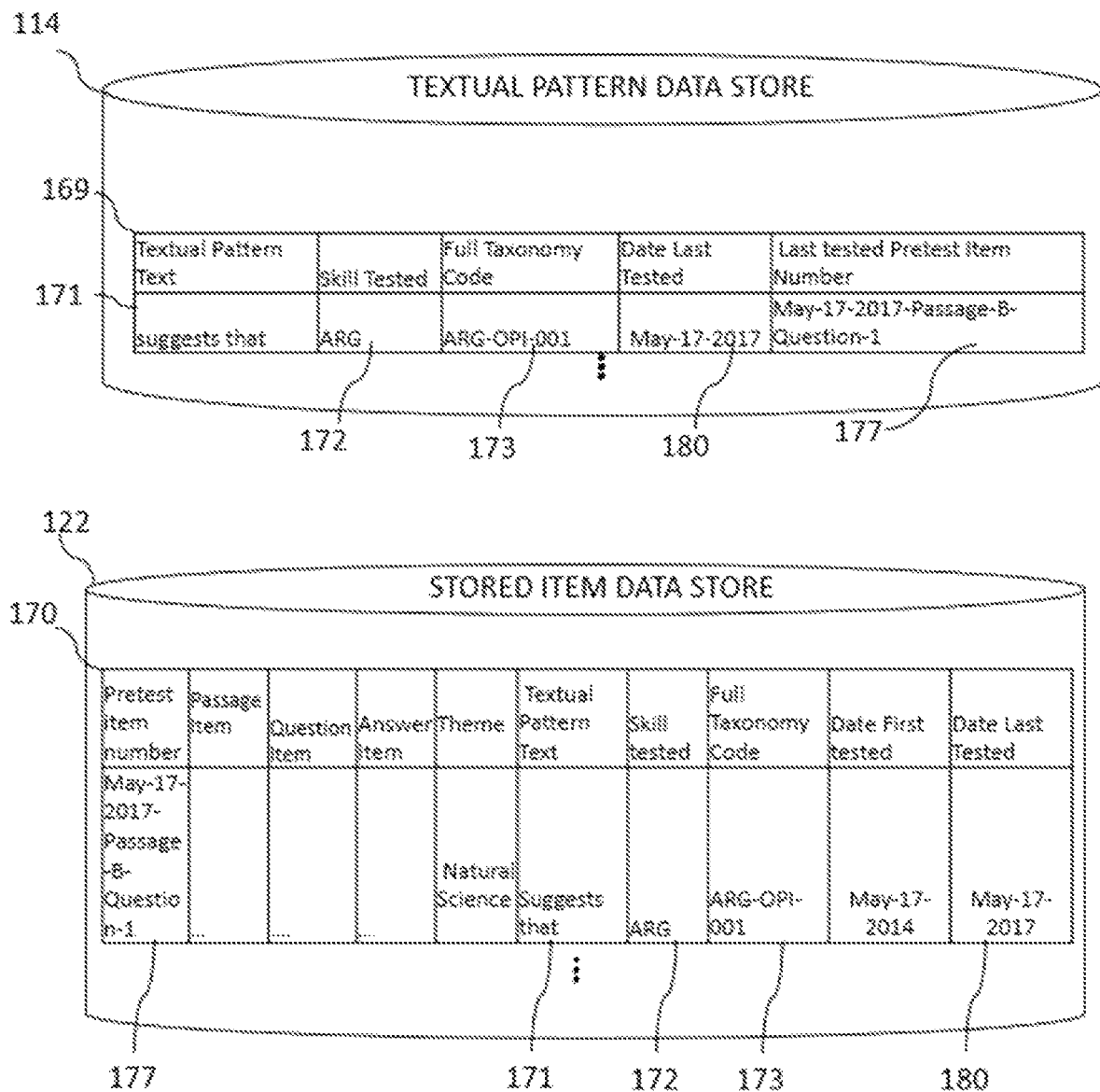
FIG. 1B illustrates example database entries for the system.

FIG. 1B shows example database entries for the system 100. For example, textual pattern data store 114 can have database structure 169 and database entries corresponding to textual patterns. Stored item data store 122 can have database structure 170 with respective database entries corresponding to stored items. Database items of the textual pattern data store 114 database structure 169 can include the textual pattern text, the skill tested, the taxonomy code, and other information. The database can also reference items from other data stores, such as the date the textual pattern was last tested, and the item the textual pattern was last tested on. As an illustration, there can be an textual pattern text data entry 171 corresponding with the search string "suggests that," which tests an argumentative skill 173 (ARG). The database 169 can refer to item data store 122 for item 177 where the textual pattern was last tested (i.e. by reference to an item reference number, e.g. May-17-2017-Passage-B-Question-1) and the date of the last test 180 (e.g. May-17-2017).

Database items of the textual pattern data store 114 database structure 169 can include the item reference number, the passage for that item, the question (stem) of that item, the answer options of the item, various attributes (e.g. which can also reference to items in the attributes data store 120), such as the theme, and the dates last test, first tests, or the number of times tests. Moreover, database structure can also include the textual pattern(s) for each item, the skill tested, and the taxonomy code of that textual pattern. For example, the database structure 170 for the item data store 122 may include the item reference number 177 of May-17-2017-Passage-B-Question-1, with an entry for a last test date 180 (e.g. May-17-2017) and first test date (e.g. May-17-2014). For that item, there can be entries with the entire passage, question, answer options, and theme (e.g. natural science). These entries can be cross-referenced as data entries of other data stores of the data store 111, for example the theme in the attributes 120 data store or the item stems in the question data store 116. Further, database entries which can also be database entries of the textual pattern data store 114 database structure 169 can also be included, such as the textual pattern 171 "suggests that", the skill tested 172 (e.g. argumentative skill), and taxonomy code 173 (e.g. ARG-OPI-001). New entries can be created in item data store 122 as system 100 learns and/or develops new content. As textual patterns, attributes, themes, etc. of those new passages and items are identified, those passage and item entries can be updated.

Thus, methods and systems described herein can use data to map passages and items to each other, for example via textual patterns. The identification of a taxonomy code in cross-referenced databases can increase computing efficiencies when system 100 determines relevant items and when system 100 provides an overlay to the display based on textual patterns as described herein (see at least FIGS. 3-4 below). Moreover, system 100 can use data to identify textual patterns in passages, and to identify previously tested material having the same textual patterns, themes, attributes, etc. Although only two database structures which refer to each other are shown, other databases in data store 111 can refer to each other to at least facilitate improved passage mapping and item suggestion by providing an improved display for test item generation. In systems 100, database structures and references to entries thereof can automatically update, thus improving the computational efficiency and rendering of passage section highlighting and relevant items. In system 100, entries in data store 111 may be automatically updated, for example, via network 134, with real time data from testing (such as test results, question difficulty, question discrimination, or new items).

Figure 2:
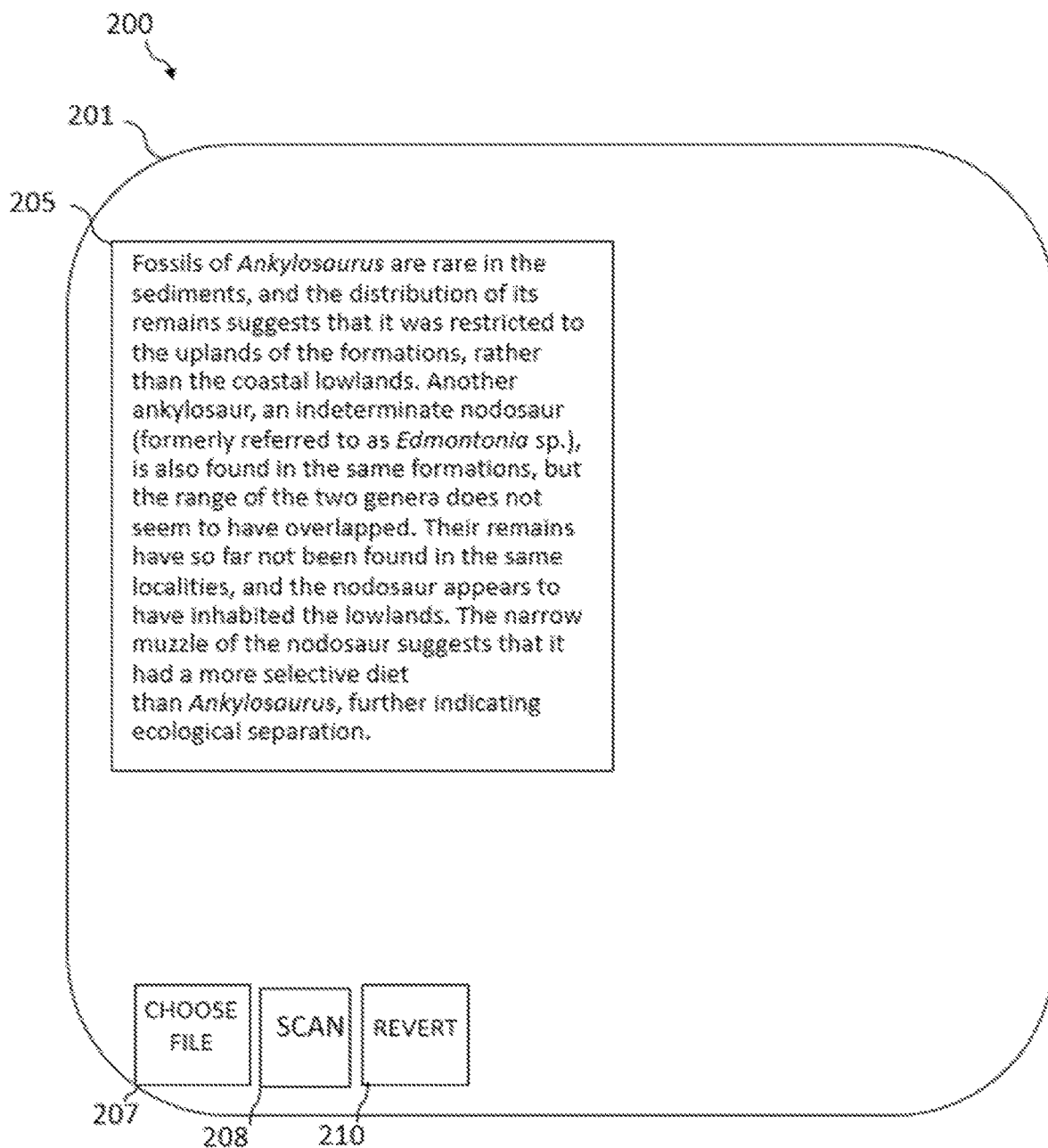
FIG. 2 shows a graphical user interface with an illustrative passage.

FIG. 2 shows a graphical user interface (GUI) with an illustrative passage. Passage(s) can be input into a first portion 205 of GUI 201 and correspond with a new passage that has not been provided in a historical testing environment. System 100 can receive the passage in first portion 205 of GUI 201 via passage module 140. The passage can be a user-generated passage, or a passage from some other source that may be ripe for generating test items.

Test items may include a reading comprehension item. Reading comprehension test items can be based on a taxonomy of distinct types of reading skills. Examples of such skills can include for example: understanding stated and implied comparative relationship, understanding stated and implied causal relationships, understanding argument, understanding stated and implied claims and counterclaims, distinguishing among fact, opinion, and reasoned judgment, and determining the intended meaning of words with multiple possible meanings, or the meaning of figurative language.

Such skills can involve distinctive and identifiable types of language in the passage. For example, textual patterns on understanding comparative relationships can involve comparative words or expressions in the passage (e.g. " . . . to a greater extent than . . . "). Textual patterns on understanding causal relationships can involve any of a large possible number of causal expressions in the passage (e.g. " . . . resulting from . . . "). One or more textual patterns may be used as a search string to identify comparable language between a first passage and a second passage.

GUI 201 can include interactive portions for receiving indications. Portions for receiving indications can include portions for receiving: an indication of a choice of a file for upload 207 to system 100, an indication of a request to scan 208, an indication for reverting to an unannotated state 210. Interactive portions can be triggers for system 100 and can be facilitated by trigger module 143. As an example, a reviewer may select choose file 207 to select a file from device 160, which may contain a passage for display in first portion 205 of GUI 201. System 100 may cause the passage to be displayed in first portion 205 of GUI 201. Alternatively, only the first paragraph (or any other portion) may be displayed initially in first portion 205 of GUI 201. The reviewer may select scan 208 which can indicate a request for the passage to be scanned. System 100 may scan (e.g., after tokenizing the passage) to determine the presence of one or more skill-specific textual pattern(s). System 100 can display a modification on the passage, for example a portion of the passage.

System 100, upon receiving an indication of request to scan 208, can scan the passage. Scanning can by first determining a string of characters corresponding with the passage and then scanning the string of characters. System 100 can automatically scan the passage as text is entered into first portion 205 of GUI 201, or upon receiving an indication of a choice of a file for upload 207.

Upon scanning, system 100 may tokenize the passage. Tokenizing the passage can include separating it into tokens, which can be, for example, words, sentences, and parts of speech. Tokenizing can include automatically turning portions of the passage to tokens. Tokenizing can further include removing prefixes or suffixes of words (e.g. "ing" or "ed") to determine root words. System 100 can tokenize by removing special characters or whitespace. Tokenization techniques may take the form of a regular expression using one or more identifiers to divide the text input into individual words and sentences. In embodiments, identifiers may consist of punctuation or spaces. For example, the tokenization technique may transform a portion of a stored item in item data store 122 into one or more individual words, resulting in one or more individual terms: "Fossils", "of", "Ankylosaurus", "are", "rare", "in", "the", "sediments", ",". System 100 can also pre-process by spell checking or getting rid of non-relevant segments, such as stop words. Each token can be stored into an array in data store 111.

Tokens can be stored in array data structures (e.g. stores in memory), where each token can be addressed and read. For example, data storage may include of a hard disk drive, a floppy disk drive, a magnetic tape drive, an optical disk drive, a CD or DVD drive (R or RW), flash memory, cache, or other removable or fixed media drive may be provided.

After tokenization, system 100 may query textual pattern data store 114 to determine the presence of textual patterns in the passage. The textual patterns can correspond with one or more search strings and relate to skill-specific language cues. Thus, the textual patterns can be indicative of reading assessment skills. Instances of such skill-specific language cues can be identified (e.g. based on content expert suggestions, past successful test items, past manual passage mapping by content specialists, internet searches, library content). The textual patterns can gathered into large libraries of search string patterns, organized by taxonomy code. These large libraries can be used for automated passage scans. The large libraries can be implemented as textual pattern data store 114.

Each passage can be scanned. Each token of the previously tokenized passage may be queried against textual pattern data store 114. System 100 can determine the textual patterns in the passage and/or test items. For example, textual pattern data store 114 may contain the textual pattern "suggests that", and "suggests that" may be identified as a textual pattern in the passage by querying textual pattern data store 114. System 100 may indicate this textual pattern as an opportunity for developing a test item for testing understanding of argumentative reading comprehension. As another example, when the passage scan finds a "causal" textual pattern in that passage (e.g. "as a consequence"), the word or phrase can be indicated as an opportunity to develop a test item testing understanding of causal relationships.

Figure 3:
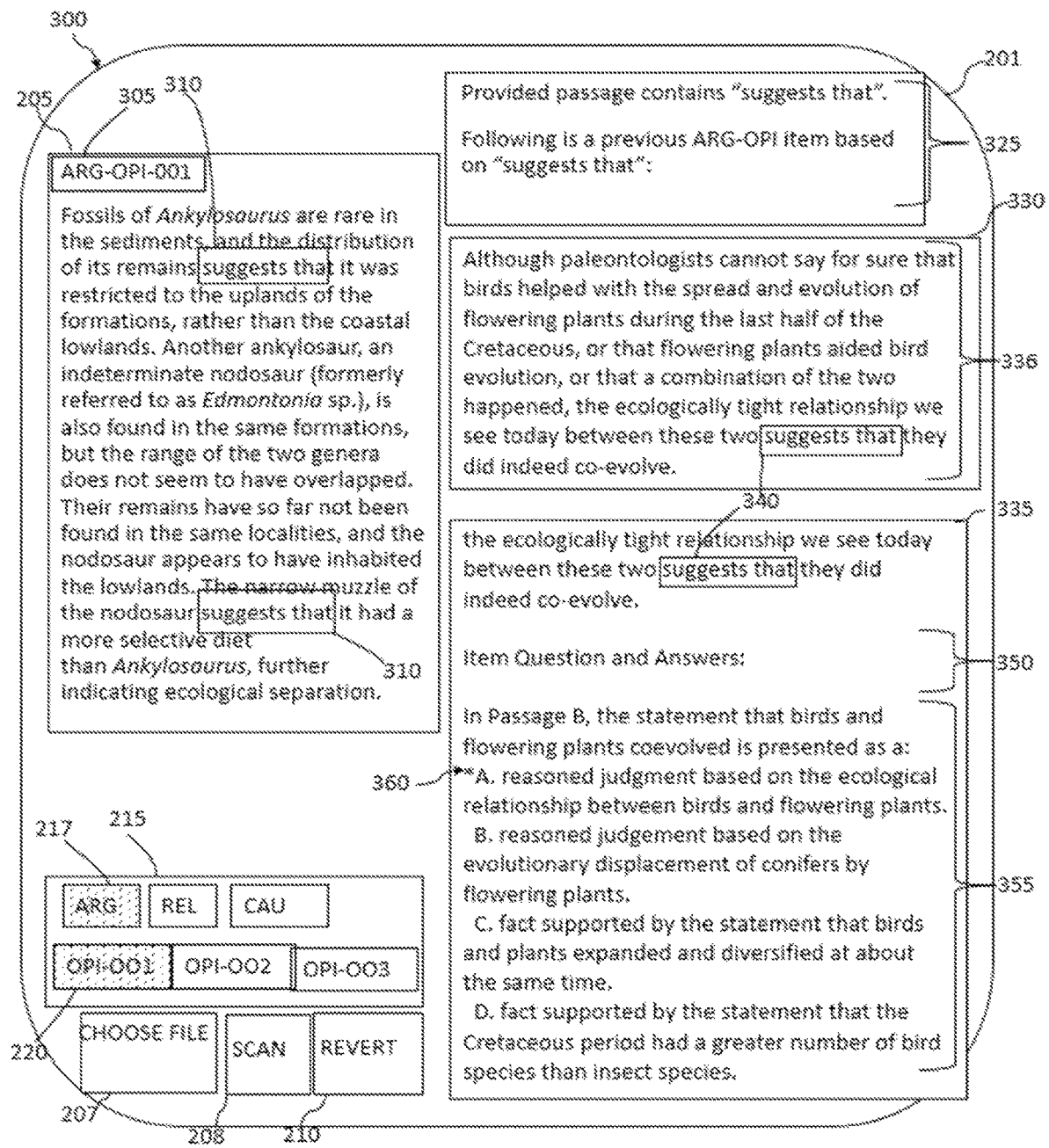
FIG. 3 shows a graphical user interface with an illustrative input passage, stored item, and one or more search strings.

FIG. 3 shows an interface rendering of the main textual components. FIG. 3 shows the graphical user interface 201 with annotated passage and stored item for interface rendering of textual components to allow for test item development. Upon the user selecting Scan 208 and finding a textual patterns in the passage, as described with reference to FIG. 2, the system 100 can provide for display at least a portion of the passage. For example, at least a paragraph of the passage can be displayed in the first portion 205 of the GUI 201. The selected portion of the passage provided for display may have a higher density of found textual patterns 310, or have textual patterns 310 of a specific taxonomy code 305, or otherwise indicating an opportunity for test item development of a specific language skill. The density of found textual patterns 310 may be determined by the words that are part of found textual patterns, divided by the sum of those words and the words which are not part of a textual pattern. The density of found textual patterns may be determined for segments of words, for sentences, or for paragraphs.

Upon the system receiving a trigger indicating a request to Scan 208 and the textual patterns 310 of the passage determined, as described with reference to FIG. 2, system 100 can annotate the passage to point out the found textual patterns 310. Each instance of the same textual patterns 310 can be annotated, for example, in the same manner.

Annotations can correspond with a string marker. String markers can be a superimposed shape, such as circle, square, underline, arrow, or pointer. String markers can be a manipulation of text, such as a highlight, text color, bolding, capitalization, or underline. In some examples, each portion of the passage (e.g. a sentence or a paragraph) can be depicted in its own line. Taxonomy code(s) 305 associated with the specific textual pattern(s) 310 can be displayed proximate to and/or as part of the overlay of the passage.

Proximate to the displayed passage, the taxonomy codes of textual patterns can be displayed in taxonomy code portion 217 of the GUI 201. Alternatively or additionally, a listing of each such textual pattern can be displayed. The found taxonomy codes (e.g. first taxonomy code 215 represented by ARG, which can indicate an argumentative skill, and/or second taxonomy code 220 represented by OPI-001 which can indicate a specific textual pattern suggesting an argumentative skill, e.g. "suggests that") can be arranged so as that the taxonomy codes can be displayed according to specific skill, such as ARG for argument, REL for relationship, and CAU for causal skills. In the shown example, taxonomy codes containing ARG, REL, CAU may have been found in the passage (i.e. textual patterns corresponding to indications of testing understanding/comprehension of argumentative language, relationships, or causation). The skills and/or codes in taxonomy code portion 217 of GUI 201, can be interactive portions and can operate as input triggers to system 100.

As an example, if the reviewer selects first taxonomy code 215 (e.g. indicating ARG for testing argument skills), taxonomy codes corresponding to the found textual patterns can be displayed. Other taxonomy codes may include second taxonomy code 220 ARG-OPI-001, and/or ARG-OPI-002, and/or ARG-OPI-003. A portion of the taxonomy codes or the full taxonomy codes may be displayed (e.g. OPI-001 instead inf ARG-OPI-001). Alternatively, the found textual patterns corresponding to selected taxonomy code skill can be displayed (e.g. "suggests that" instead of second taxonomy code 220).

System 100 may retrieve taxonomy codes and/or textual patterns from textual pattern data store 114. Alternatively, the textual patterns corresponding to the taxonomy codes may be displayed in this taxonomy code portion 217 of the GUI. Upon receiving a trigger of that selection, for example via trigger module 143, system 100 can provide for display of an annotation of the passage displayed in first portion 205 of GUI 201 so as to distinctly point out those textual patterns 310 found in the passage corresponding to the selected taxonomy codes (e.g. first taxonomy code 215, or second taxonomy code 220). A reviewer may select one or more taxonomy code (e.g. second taxonomy code 220). The taxonomy code can be related to or indicate textual patterns which convey, for example, a comparative relationship, causal relationship, argument, fact, opinion, reason, judgement, evidence, intent, or theme. The annotation can include one or more taxonomy markers or manipulations of the passage. The system 100 can be updated so that the textual patterns 310 corresponding to the one or more selected taxonomy code(s) in the taxonomy code portion 217 of the GUI 201 can be proximately displayed, (or not) depending on if the corresponding taxonomy code is selected or not in the taxonomy code portion 217 of the GUI 201. Moreover, a selection of Revert 210, can indicate a request to revert to the display of the original passage, such as the passage displayed in FIG. 2 in the first portion 204 of the GUI 201.

Upon the system receiving a trigger indicating a request to Scan 208 and the textual patterns of the passage are determined as described with reference to FIG. 2, system 100 can retrieve a stored item (e.g. from item data store 122) and display it in second GUI portion 330 and/or third GUI portion 335 of GUI 201.

The stored item can be a relevant item provided in a historical test environment. System 100 can retrieve and display one or more (e.g. two, three, four, five) stored items and automatically alter the display (e.g. by decreasing order or relevance based on the determined relevance). The stored item can be relevant to the passage if it contains one or more textual patterns 340 which are the same as textual pattern 310 in the passage, and or if the stored item has desirable attributes associated with it (e.g. as queried in attributes data store 120 or otherwise determined). System 100 can assign a relevance score to stored items, and provide for the display any relevant stored items (e.g., highest relevance score, top two or three stored items, etc.).

A taxonomy marker can be used to indicate textual pattern 340 of the stored item. The same taxonomy marker used to identify textual pattern 310 of the passage can be used for textual pattern 340 of the stored item, if for example the textual patterns are the same. A visually similar taxonomy marker can be used (e.g. similar color) when the textual patterns are languages cues for the same assessed skill but correspond to different language cues (or search strings in textual pattern data store 114). Other visual, acoustic, or other technique to assist in passage-mapping for assessment item development may be employed.

System 100 can provide for display prompt 325 for the stored item which is provided for display. Prompt 325 may include a recitation of relevant textual pattern(s) 340 and/or taxonomy code thereof. For example, prompt 325 may recite: "Provided passage contains textual pattern 'suggests that'. The following is a previously developed ARG-OPI item based on 'suggests that'".

The stored item provided for display can be a portion of the stored item in item data store 122. The portion can be a section, paragraph, and/or sentence portion 336 that contains textual pattern 340. The stored item provided for display can include a question and answer prompt 350. The stored item provided for display can include a question and answer 355 as retrieved from the question and answer data store(s) 116, 118. The correct answer can be noted by a correct answer indication 360. Moreover, distractor answers can be noted by other visual indications. Attributes which are related to the displayed stored item (not shown) can be displayed proximate to the stored item, e.g. year, theme, topic, expected time to complete, percentage of test takers which selected a particular answer, question discriminator, a first and/or last test date, a question difficulty, a scholastic area, and/or distractor answers.

The system 100 can allow for the content specialist to generate a test item with the assistance of the annotated passage and the annotated stored item mapping, for example, as shown in FIG. 3.

Figure 4:
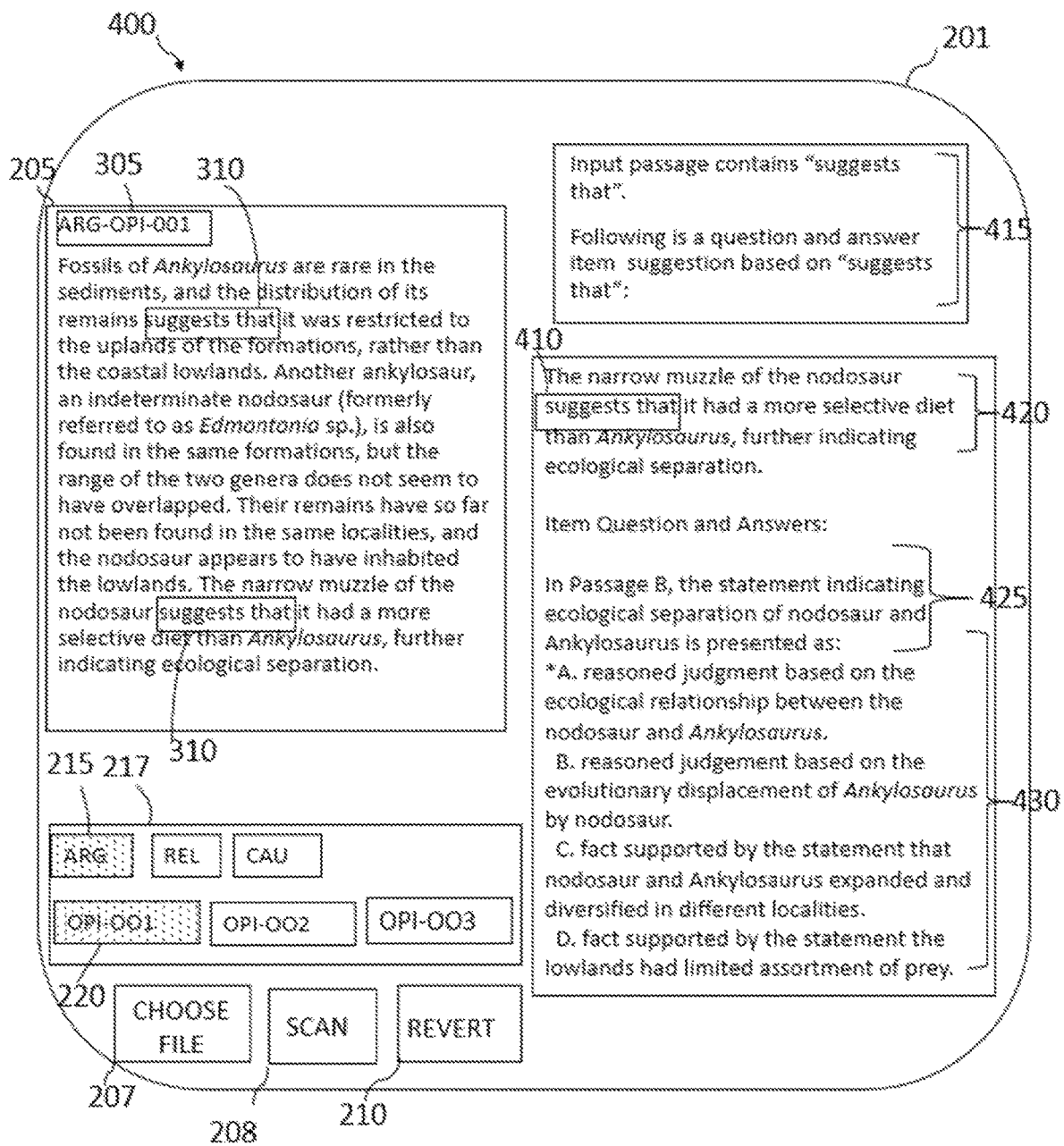
FIG. 4 shows a graphical user interface with an illustrative input passage, stored item, and one or more search strings.

FIG. 4 shows a graphical user interface with an illustrative input passage, stored item, and one or more search strings. For example, interface 201 includes suggested generated test item for assessment item development. The passage and/or stored item can be displayed as shown in FIG. 2-3. In addition, system 100 can generate, determine and/or display a test item, including a test item passage (e.g. in first portion 205 of the GUI), prompt 415 for the new test item, a question and answer, testable portion 420 of the test item passage, and test item question 425 and answer options 430. The generated and displayed test item can update depending on which of the found taxonomy codes 215, 220 are selected, or otherwise indicated as referring to a testable skill or concept. More information regarding development and generation of test items is shown with reference to FIG. 6.

Figure 5:
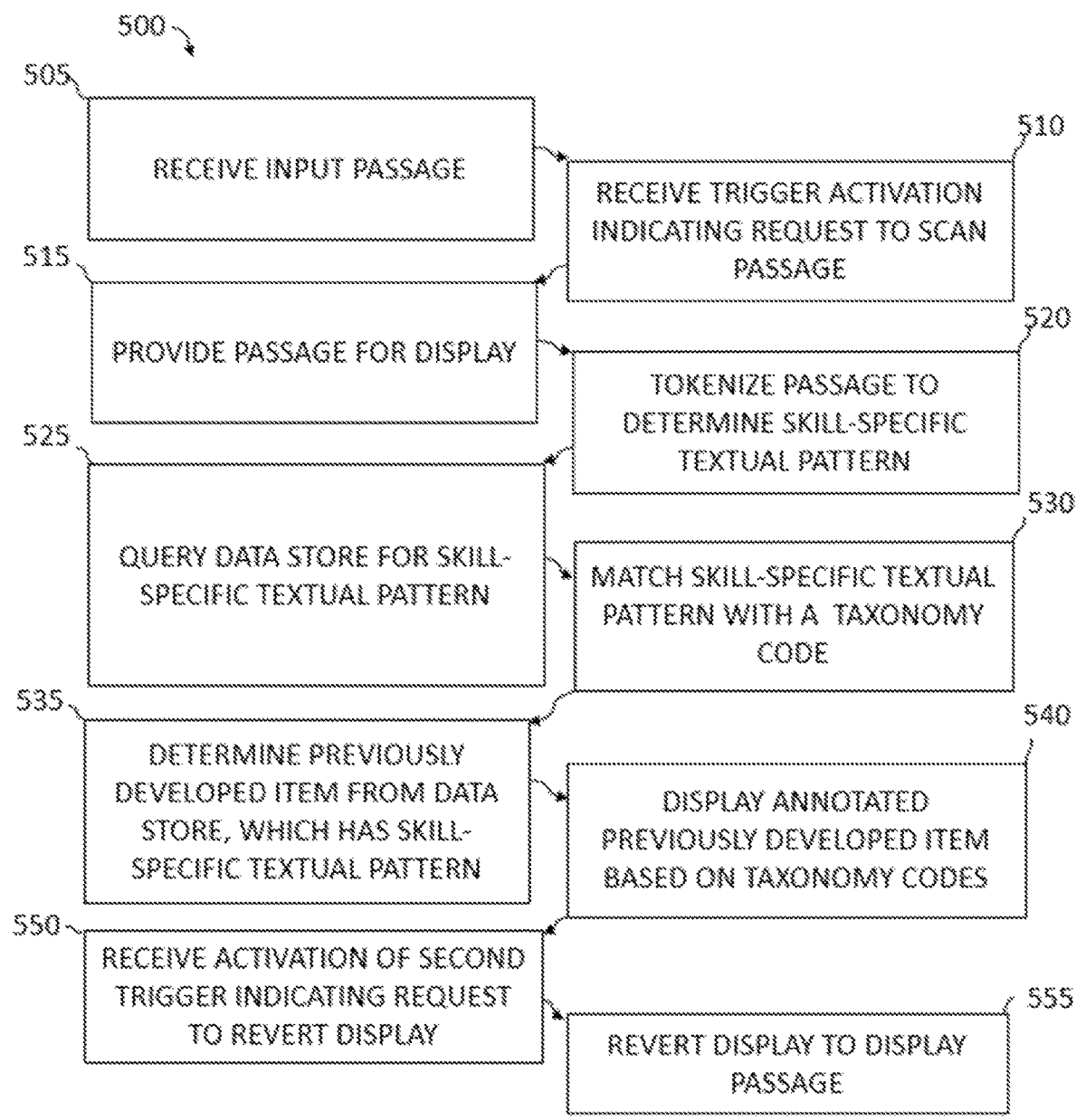
FIG. 5 illustrates a flow chart showing passage-mapping steps for item development.

FIG. 5 illustrates a flow chart showing passage-mapping steps for item development. For example, flow chart 500 can include passage mapping steps and prior item suggestion steps for assessment item development.

At step 505, the system can receive an input passage. The input passage can be received as described in FIG. 2, with relation to providing for display the passage in the first portion 205 of the GUI 201.

At step 510, the system can receive a trigger activation indicating a request to scan the passage. System 100 can activate trigger module 143, and/or initiate an interactive portion of the GUI 201 for receiving the indication request to scan 208. System 100 can automatically scan the input passage as text is entered into the first portion 205 of the GUI 201, thus receiving text (or new text) in the first portion 205 of the GUI 201 can be the trigger activation for a request to scan. In system 100, the input passage can be automatically scanned when the action of choosing a file.

At step 515, the system can provide a passage for display. The display may include at least a portion of the passage. For example, system 100 is configured to provide the passage, or portion thereof, for display as discussed in relation to the displayed passage in first portion 205 of GUI 201 in FIGS. 2-4. As with each of the steps discussed in FIG. 5, steps 510 and 515 may be interchanged.

At step 520, the system can tokenize the passage and search for one or more skill-specific textual patterns in the passage. Tokenizing and searching the passage to determine the textual pattern can be performed as described with reference to FIGS. 2-4 above.

At step 525, the system can query textual pattern data store 114 to determine the skill-specific textual pattern in the passage. For example, system 100 can query textual pattern data store 114 to determine the textual patterns in the passage. The textual patterns can correspond with search strings. Each token of the passage can be queried in the textual pattern data store 114. Alternatively or in addition to step 525, system 100 can determine the textual patterns in the passage by applying a trained machine learning item evaluation model to determine the textual patterns. Training the model to identify textual patterns is elaborated on further in relation to at least step 805 through step 825 of method 800 in FIG. 8. Applying the model to identify textual patterns is also shown in relation to FIG. 8.

At step 530, the system 100 can, where appropriate (i.e. where a skill-specific textual pattern was identified in step 525), match the skill-specific textual pattern with a taxonomy code 305. Taxonomy code 305 may be stored in textual pattern data store 114.

In some embodiments, steps 520, 525, and 530 can be performed recursively. For example, system 100 can tokenize the first pretest item into words, sentences, and parts of speech and query textual pattern data store 114 to determine if the passage contains a skill-specific textual pattern, as shown in step 525. Step 525 (and optionally step 530) can be successively performed until all textual patterns have been searched and, if found, matched with a taxonomy code at step 530.

At step 535, the system can determine a stored item from item data store 122. System 100 can determine a stored item which is relevant to the passage (or relevant testable portion thereof) at step 505 and determine the relevant stored item by assigning relevance score(s) to the stored item(s) in item data store 122. System 100 can apply a trained machine learning item evaluation model to determine a relevant stored item (which is elaborated on further in relation to step 850, of method 800 in FIG. 8). The determined stored item can have the skill-specific textual pattern which was previously identified in the passage. The determined stored item can have the skill-specific textual pattern in a question item (e.g. as queried in question data store 116) and/or in a correct answer of the stored item (e.g. as queried in the answer data store 118), which may indicate the specific skill-specific textual pattern related to the skill tested in that stored item. The stored item can have the most instances, or the highest density of the skill-specific textual patterns which were previously identified in the passage. The identified stored item can have the skill-specific textual pattern having the same taxonomy code found in as the passage. The identified stored item can have a skill-specific textual pattern testing the same skill as the passage.

Determining and selection of the stored item can further be based on one or more attributes of the stored item. The system 100 can apply a trained machine learning item evaluation model to determine a relevant stored item based on the attributes. The attribute of the stored item can be in the attributes data store 120. The attributes can be assigned weights based on how relevant the attributes are to selecting a stored item. The attribute can be a last test date, a question difficulty, a question discriminator, a theme, an enemy theme, scholastic area, or distractor. Themes can be, prose, humor, literary narrative, social science (psychology, sociology, education, civics, government), natural science (biology, chemistry, physics, technology, astronomy, medicine). For example, past unsuccessful items where no or all of the test takers got the question correct (thus were poor discriminators) can be avoided and not suggested or provided for display by system 100.

As an example, system 100 can receive the theme or topic of the passage. The theme may be received using a machine learning based model as described in relation to FIG. 7, by receiving the theme from the data store 111, or by the reviewer interface 138, for example. System 100 can then select the relevant stored item (e.g. from item data store 122) that has the same theme as the passage. In some examples, system 100 can select a theme other than an enemy theme. For example, an enemy theme may correspond with a different theme than the theme of the passage. Enemy themes can be humor and natural science, for example.

As another example, system 100 may query the attributes data store 120 and select the stored item which has previously been tested more recently in time or least recently in time, etc. System 100 can apply weights to these attributes. As an illustrative sample, system 100 may weigh more heavily the presence of the previously determine skill-specific textual pattern at step 530, less heavily the theme or topic, less heavily the percentage of students who got the answer correct, and least heaviest, for example, the last date the item had occurred in a test. Any combination of attributes, theme, and/or presence of skill-specific textual patterns, with any weight attributed thereof, can be used to determine a relevant stored item.

Although step 535 refers to determining a single stored item, one or more stored items can be determined (for example, the top three most, or top five most relevant items). Moreover, system 100 can assign relevance scores to one or more stored items. The relevance score can define the degree to which the stored item relates to the passage.

At step 540, the system can provide for display the annotated stored item. The stored item can include a portion of passage 336, together with an associated previously-developed question and answer prompt 350, and/or the question(s) and answers 355. The annotation can be based on the identified taxonomy codes and/or the textual patterns of the stored item. The annotation can be an overlay prominently depicting the skill-specific textual patterns associated with the identified taxonomy codes. The annotated stored item can be provided for display as shown in FIG. 3 (see annotation, at least in the form of square taxonomy marker at textual pattern 340). The annotation can include relevant taxonomy markers, display of attributes (e.g. a last test date), display of relevance score, and/or a correct answer indication 360. Alternatively, the stored item can be displayed without annotation.

Although the method 500 refers to displaying a single stored item at step 540, one or more stored items can be displayed (for example, the top three or top five most relevant items). System 100 can retrieve and display one or more (e.g. two, three, four, five) relevant prior assessment items (or portions thereof, or links to the file location thereof), and automatically provide for display in an organized manner (e.g. by decreasing order or relevance based on the determined relevance, with most relevant stored item closer to the passage in the display). Moreover, system 100 can allow for cycling through of the display of stored items, or can provide a rotating display of stored items, for example, from the most relevant to least relevant. In system 100 where entering new text is the trigger activation for scanning at step 515, system 100 can automatically annotate the passage as text is entered into first portion 205 of the GUI, for example by highlighting textual patterns as they are entered.

At step 550, the system can receive activation of a second trigger. The second trigger can indicate a request to revert the display. A selection of revert 210 as shown in FIGS. 2-4 can indicate the request to revert the passage and/or stored item into unannotated states (i.e. without any overlay).

At step 555, the system can revert the display to the passage upon the activation of the second trigger in step 550. For example, the passage can be reverted to the passage as received by system 100 in step 505, and as provided for display in FIG. 2 in the first portion 204 of the GUI 201.

Figure 6:
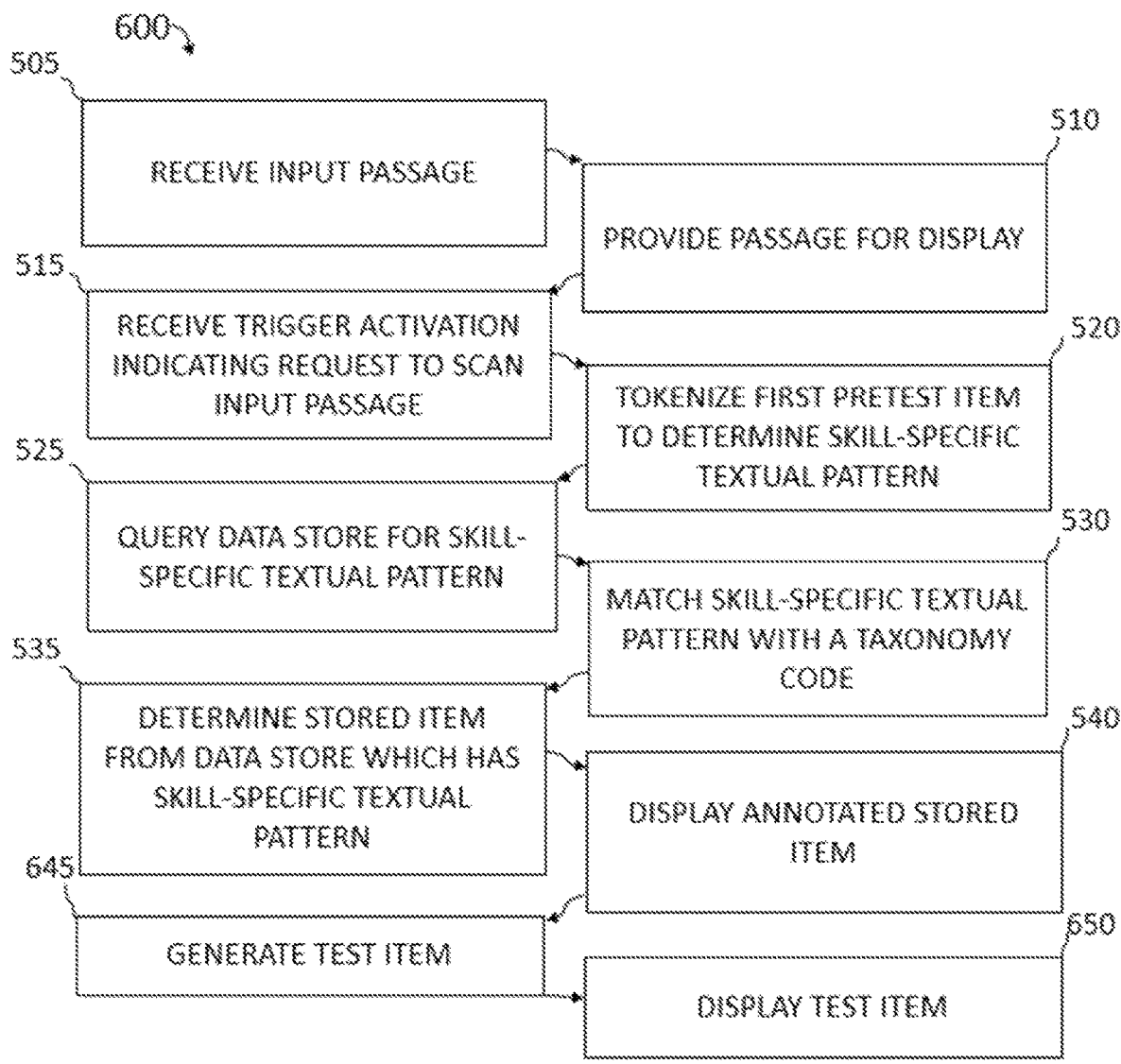
FIG. 6 illustrates a flow chart showing passage-mapping steps, item suggestion steps, and new item development steps in a method for item development.

FIG. 6 illustrates a flow chart showing passage-mapping steps, item suggestion steps, and new item development steps in a method for item development. In method 600, steps 605, 610, 615, 620, 625, 630, 635, and 640 may be similar to steps 505, 510, 515, 520, 525, 530, 535, and/or 540, respectively, as described in relation to method 500 of FIG. 5.

At step 645, the system may generate a test item. The test item can be determined by tokenizing the passage and/or determining textual patterns and themes of the passage as described herein. The test item can further be determined by determining a relevant stored item. System 100 may implement detection and recognition of semantic and linguistic properties of the passage and stored item.

The generated test item can have a passage portion based on the passage. The generated test item passage portion can be based on a portion of the passage which has a higher density of assigned taxonomy codes, most frequent taxonomy code, or certain type of taxonomy code. System 100 can otherwise use the NLP engine 107 to alter the difficultly of the passage (for example to take a challenging passage and make it comprehensible to a student of a lower reading level).

The passage portion can be displayed in the first portion 205 of the GUI 201. The test item can also have a multiple choice item. A multiple choice item can also be generated, each portion of which (i.e. a question (stem) portion and an answer portion) can be based on the corresponding portion of the passage, a theme of the passage, and/or the stored item. For example, the question item of the generated item can have semantic and linguistic properties that mirror the question of the identified stored item (e.g. in Question data store 116), but with the subjects, nouns, adverbs of the stored item, specifically, around the (e.g. in the same paragraph, sentence, etc.) textual pattern of the passage as identified by the NLP engine 107. The selected textual pattern can be in the generated test and/or answer item. The attributes in the attributes data store 120 can also be used to general the test item. For example, answers can include similar distractor ideas as used in previous developed content.

Other methods of automated reading passage generation are provided in U.S. patent application Ser. No. 16/671,120 filed on Oct. 31, 2019, and titled "Automated Reading Passage Generation," which is herein incorporated by reference in its entirety for all purposes.

Generated test items can also be added to item data store 122, and as entries in the relevant data structure 170 for use in systems and methods described herein. For example, at step 505, the system 100 may receive a passage containing the sentence "The narrow muzzle of the nodosaur suggests that it had a more selective diet than Ankylosaurus, further indicating ecological separation." "Suggests that" may be identified as a skill specific textual pattern item at step 520, step 525, and/or step 530. If a stored item which is determined at step 535 (and optionally displayed at step 540) can include a sentence in the passage: "Although paleontologists cannot say for sure that birds helped with the spread and evolution of flowering plants during the last half of the Cretaceous, or that flowering plants aided bird evolution, or that a combination of the two happened, the ecologically tight relationship we see today between these two suggests that they did indeed co-evolve." The stored item can include a question and answer: "Question: In Passage B, the statement that birds and flowering plants coevolved is presented as . . . . Answer: reasoned judgment based on the ecological relationship between birds and flowering plants." The system 100 can generate a prompt 415 for test item question and answer, and a test item question 425 and answer 430 that includes: "In Passage . . . , the statement indicating ecological separation of nodosaur and Ankylosaurus is presented as: . . . a reasoned judgment based on the ecological relationship between the nodosaur and Ankylosaurus."

System 100 can generate the test item by applying a trained machine learning item evaluation model, which operates at least on the NLP engine 107 and/or prediction and learning engine 109. Moreover, system 100, upon performing steps 645 and 650, system 100 can receive feedback from reviewer interface 138 that system 100 correctly or incorrectly generated the test item. Other useful feedback that can be collected by system 100 for the generating improved test items include additions, deletions, or comments to the suggested generated items. System 100 can update the trained machine learning model accordingly to the feedback.

At step 650, the system can display the test item. The test item can be displayed as shown in FIG. 4. For example, the display may include a passage (e.g. in first portion 205 of the GUI), a prompt 415 for test item a question and answer options, the testable portion 420 of the test item passage, and test item question 425 and answer 430.

Figure 7:
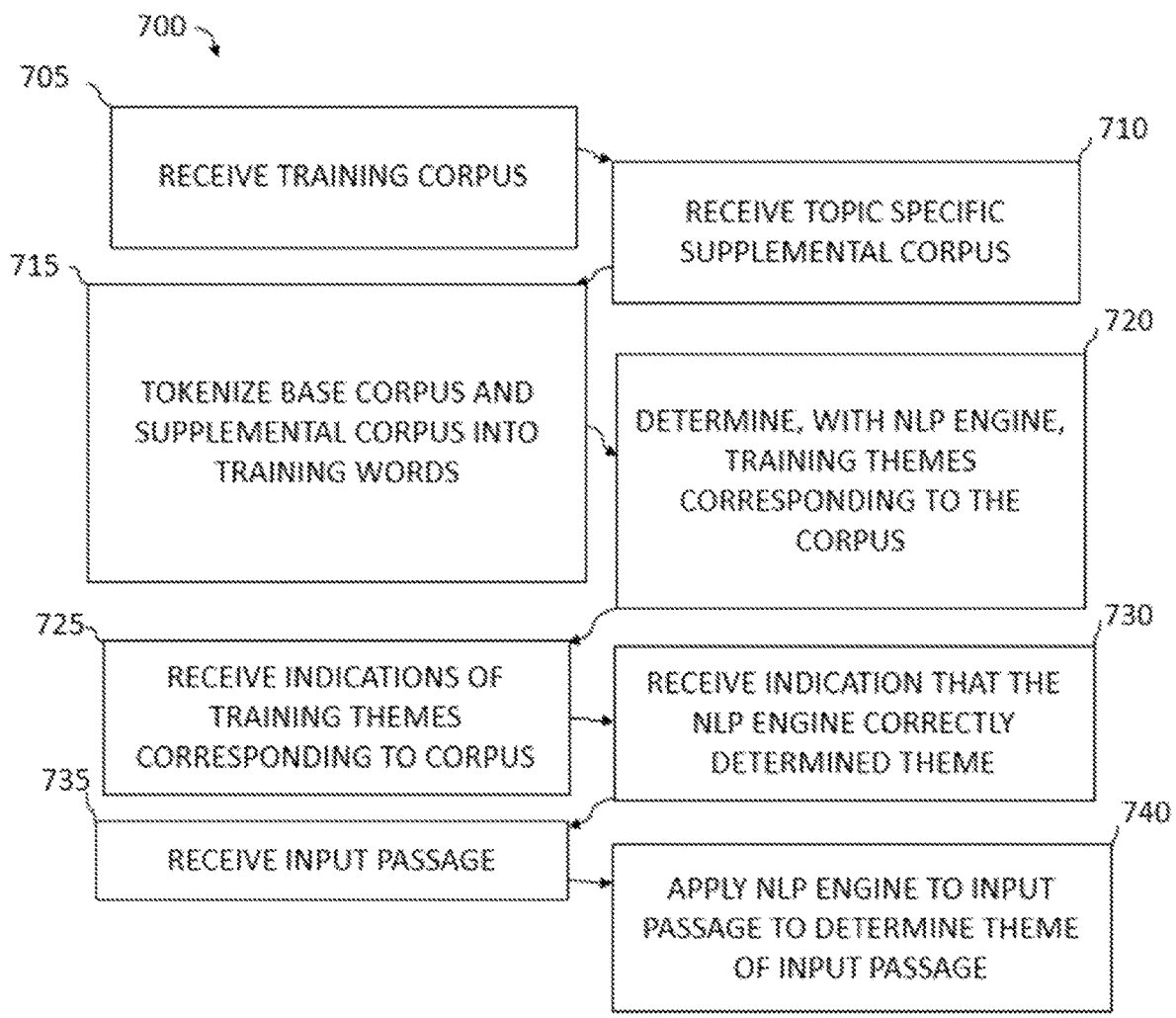
FIG. 7 illustrates a flow chart for applying a trained machine learning item evaluation model of a NLP engine to determine theme of a new passage.

FIG. 7 illustrates a flow chart for applying a trained machine learning item evaluation model of a NLP engine to determine theme of a new passage. In method 700, a trained machine learning item evaluation model may be implemented to determine a theme of passage.

At step 705, the system can receive a training corpus. The training corpus can be received over network 134, or can be stored in corpus data store 112 of system 100.

At step 710, the system can receive a topic-specific supplemental corpus. The topic-specific supplemental corpus can be received over the network 134, or can be in the corpus data store 112. The topic-specific supplemental corpus and/or the training corpus, can provide the system 100 with an indication of the linguistic features of a corpus of a specific topic. For example, a topic-specific supplemental corpus can be a medical dictionary or other field-specific dictionary. The method can alternatively be performed without the step 710.

At step 715, the system can tokenize the training corpus and/or the supplemental corpus into training words. Tokenizing the training corpus can be performed as previously described with reference to tokenization.

At step 720, the system can determine, for example with the machine learning item evaluation model operating at least on the NLP engine 107 and/or the prediction and learning engine 109, at least one training theme corresponding to the training corpus. The NLP engine 107 can detect and recognize semantic and linguistic properties to assist in determining the training theme.

At step 725, the system can receive indications of training themes corresponding to the training corpus.

At step 730, the system can receive an indication that NLP engine 107 and/or the prediction and learning engine 109 correctly determined the theme at step 720. System 100 can produce this indication by comparing the determined training themes with the received indications in step 725. Alternatively, or in addition, method 700 can include receiving an indication (or otherwise determining) that the machine learning based item evaluation model did not correctly determine the theme at the previous step 720. Step 705 through step 730 may be repeated until the system is trained to recognize a variety of themes from a variety of training corpuses. The method 700 can further include updating corpus training sets accordingly.

At step 735, the system can receive an input passage (or other passage which is modified from the input passage). This step can be performed as described in relation to steps 505 of method 500 of FIG. 5. and method 600 of FIG. 6.

At step 740, the system can apply the machine learning based item evaluation model to determine a theme of the input passage. The machine learning based item evaluation model can be implemented by NLP engine 107 and/or prediction and learning engine 109. Thus, systems and methods described herein can be used to train a trained machine learning item evaluation model for evaluating and determining a theme of a passage used to develop assessment items and systems and methods described herein can use the trained machine learning item evaluation model to determine the theme(s) of passages. In addition, if a theme of the passage is provided by the user, the passage can be used to further train the model, for example by using the passage as a training corpus in step 705. Alternatively, the steps described herein can be used to determine theme of previously tested items in item data store 122. The theme of such stored items can be included as an attribute in attributes data store 120. Corpus training sets can accordingly be updated.

Figure 8:
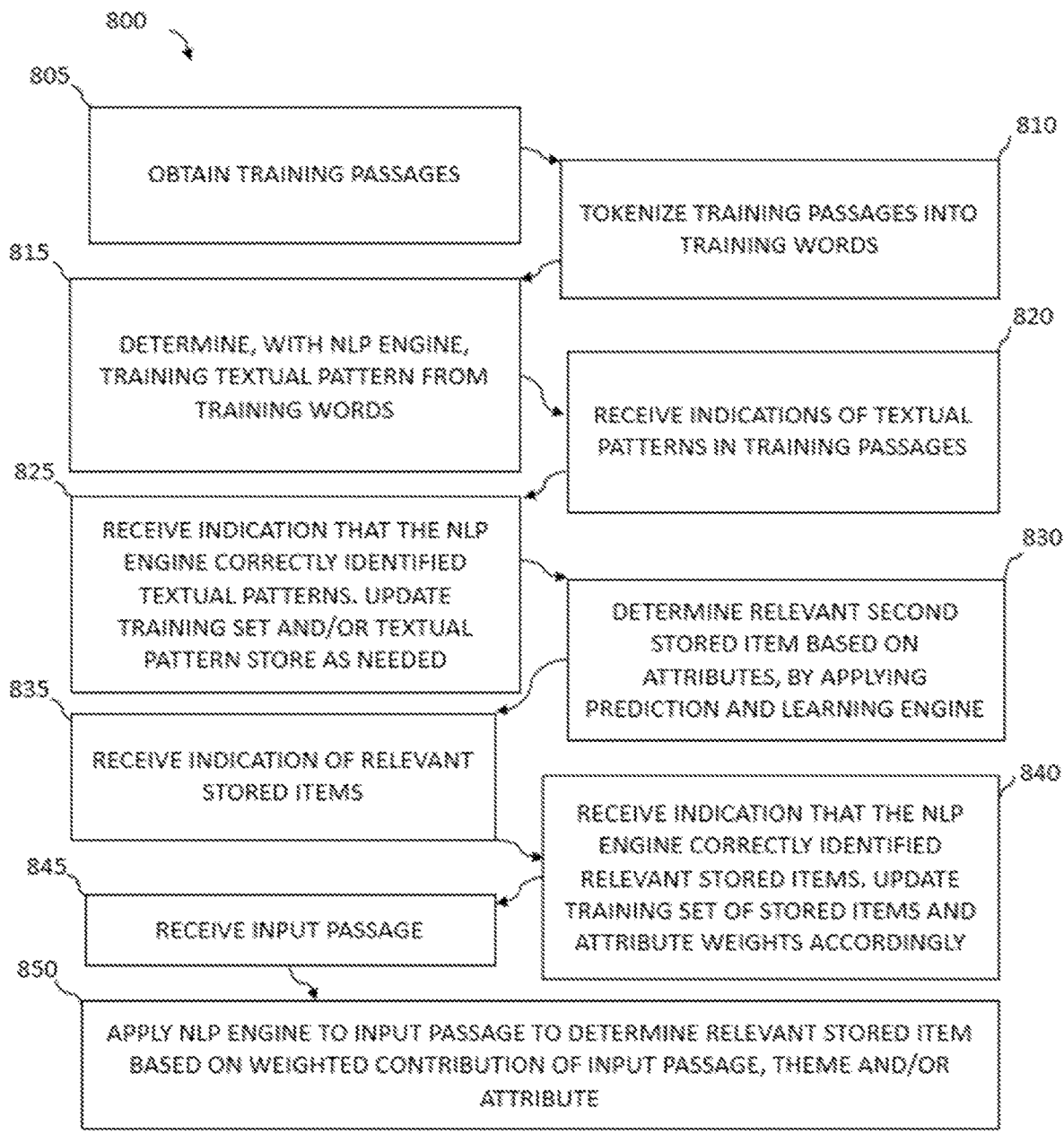
FIG. 8 illustrates a flow chart showing determining a stored item using the NLP engine.

FIG. 8 illustrates a flow chart showing determining a stored item using the NLP engine. The system may use, for example, a trained machine learning item evaluation model, operating on the NLP engine 107 and/or prediction and learning engine 109. Method 800 can be used to perform step 535 and/or step 540 of method 500 of FIG. 5 and/or portions of FIG. 6.

At step 805, the system can obtain a training passage or a training set of passages. Training passages can be historical assessment content used in historical testing environments. Training passages can be passages from corpus data store 112, stored items in item data store 122, or otherwise obtained via the network 134, for example by the internet or at field test locations.

System 100 can train the machine learning item evaluation model to determine the textual patterns in passages stored item and/or query textual pattern data store 114. Training the model to identify textual patterns can be performed as described in step 810 through step 825 of the method 800.

At step 810, the system can tokenize the training items (or set thereof) into training words. Tokenizing can be performed as previously described herein.

At step 815, the system can determine, for example with the machine learning based item evaluation model operating on the NLP engine 107 and/or the prediction and learning engine 109, textual patterns from the training words.

At step 820, the system can receive indications of textual patterns.

At step 825, the system can receive an indication that the NLP engine correctly (or incorrectly) identified the textual patterns. System 100 can produce this indication by comparing the determined textual patterns at step 815 with the received indications in step 820. Method 800 can further include updating the training set of passages and/or textual pattern data store 114 as needed. Step 805 through step 825 can be repeated until the system is trained to recognize textual patterns reflecting a variety of skills. Method 800 can be used to train systems 100 to learn new textual patterns, and new ways of using the textual patterns in passages. System 100 can identify new textual patterns relevant to developing test items for a variety of training passages.

Further, the relevant stored item (e.g. from item data store 122) can be determined by system 100 based on a weighted contribution of attributes determined by a trained learning model. Steps 830 through 840 can refer to training the machine learning based model to determine relevant stored items based on an input passage.

At step 830, the system can determine the relevant stored item. The relevant stored item can be a previously developed item in item data store 122, and can be relevant to the training passage obtained at step 805 (or any other training passage, such as a corpus, received by the system 100). The relevant previously developed item can be determined by applying prediction and learning engine 109 and/or NLP Engine 107 and based on a weighted contribution of textual patterns and/or taxonomy code, theme, and/or attributes. The theme of the training passage can be determined in the various ways previously described (for example in relation to method 700 of FIG. 7, or by receiving an indication of a theme from the reviewer). The textual patterns of the training item can be determined in the various ways previously described (for example by tokenizing the training pretest item, querying textual pattern database 114, and/or matching the skill specific textual pattern with a taxonomy code as described in relation to step 520 through step 530 shown in FIG. 5, or as described in relation to step 805 through step 825 of method 800). Attributes can be in the attributes data store 120, and can be associated with stored items. The weights in the weighted contribution of textual patterns and/or taxonomy code, theme, and/or other attributes, can be in data store 111, main memory 106, or a program in such memory (for example in the program for the machine learning based model). The relevant stored item can be determined based on the weighted contribution algorithm. Any combination of attributes, theme, and/or presence of skill specific textual patterns, with any weight attributed thereof, can be used to determine the relevant stored item.

For example, the presence or absence of a textual pattern can be afforded greater weight than any of the attributes. System 100 can also determine the second most relevant, or third most relevant (etc.) stored items. The system 100 can also assign a relevance score to the stored items based on the determined relevance.

At step 835, the system can receive an indication of a relevant stored item. System 100 can also receive an indication of other stored items. System 100 can provide a prompt or request for receiving this indication.

At step 840, the system can receive an indication that the NLP engine and/or the prediction and learning engine correctly (or incorrectly) identified a relevant stored item. This indication can be determined by the system 100 by comparing the determined relevant stored item at step 830, with the indication received at step 835. System 100 can also determine that other relevant stored items were correctly identified (or not). System 100 and method 800 can further update the training data, and the various model weights accordingly. The weighted contribution algorithm can be updated based on step 830 through step 840 (or other training steps). Steps 830 through 840 can be repeated accordingly until the system is trained to determine relevant stored items. Thus, system 100 can train a machine learning based model to identify a relevant stored item based on weighted contribution algorithm, and subsequently apply that trained machine learning based model to determine one or more relevant stored item(s) for example, at step 535 and/or step 540 of method 500 of FIG. 5, and/or of method 600 as shown in FIG. 6. Thus, a robust system that can identify relevant stored items for a variety of input passages can be created.

At step 845, the system can receive an input passage. The input passage can be received as shown in steps 505 of method 500 of FIG. 5 and of method 600 of FIG. 6, and step 735 of method 700 of FIG. 7, including by the reviewer interface 138. The theme of the input passage can be determined as indicated in method 700 as shown in FIG. 7, or otherwise received by system 100. Textual patterns of the input passage can be determined as previously described.

At step 850, the system can apply a machine learning based item evaluation model, for example operating on NLP engine 107 and/or prediction and learning engine 109 to the passage to determine a relevant stored item. Step 850 can be can be used for performing steps 535 and/or steps 540 of method 500 of FIG. 5, and/or of method 600 as shown in FIG. 6. A relevant stored item can be determined as described herein, for example based on a weighted contribution of textual pattern(s), theme, and/or other attribute. A second most relevant, or third most relevant stored item can also be determined.

System 100 can then further display and annotate the stored item as previously described (e.g. step 555) or otherwise perform steps described herein. System 100 can also receive indications (for example a feedback from the reviewer interface 138) that system 100 correctly identified a stored item and further update the weighted contribution algorithm and/or weights accordingly. Other useful feedback that can be collected by system 100 for the determining relevant items include additions, deletions, or comments to the suggested relevant items, and knowledge of how the user interacts with system 100 after the display of the determined relevant items. For example, after display of the stored item, if a user selects another taxonomy code (or skill) from taxonomy code portion 217 of GUI 201, system 100 can give less weight to the taxonomy code (or skill specific test item) in the future, if the taxonomy code in new passage 310 is that specific found taxonomy code tested in the determined and displayed item. The system 100 can update the trained machine learning model, weights, and/or database entries in the data stores 111 according to the feedback.

Systems and methods disclosed herein can be used to assist in developing and/or automatically generating new test passages, and multiple-choice items.

Systems and methods disclosed herein can be used to identify quantities and/or types of item opportunities across a large corpus, from which an item-rich portion could then be extracted for use as a passage on an assessment or for test prep materials.

Systems and methods disclosed herein can be used in identifying reading item assessment opportunities for passages or corpora.

As used herein, the term engine might describe a given unit of functionality that can be performed in accordance with one or more embodiments of the technology disclosed herein. As used herein, an engine might be implemented utilizing any form of hardware, software, or a combination thereof. For example, one or more processors, controllers, ASICs, PLAs, PALs, CPLDs, FPGAs, logical components, software routines or other mechanisms might be implemented to make up a engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where components or engines of the technology are implemented in whole or in part using software, in one embodiment, these software elements can be implemented to operate with a computing or processing engine capable of carrying out the functionality described with respect thereto. One such example computing engine is shown, for example, at least in item evaluation server 102. Various embodiments are described in terms of this example computing engine. After reading this description, it will become apparent to a person skilled in the relevant art how to implement the technology using other computing engines or architectures.

The terms "computer program medium" and "computer usable medium" are used to generally refer to media such as, for example, memory 106, data store 111, and bus 110. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the item evaluation server 102 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What I claim is:

1. A computer implemented method for facilitating development of test items, the method comprising:
   receiving, via an item evaluation server, a passage, wherein the passage comprises a plurality of textual patterns;
   providing for display, at a first object of a graphical user interface (GUI), at least a portion of the passage;
   upon activation of a first trigger at the GUI, tokenizing, via the item evaluation server, the passage into words, sentences, or parts of speech to determine a skill-specific textual pattern of the passage, wherein the skill specific textual pattern is associated with a test skill, wherein the first trigger is activated by a request to scan or by the item evaluation server;
   providing a search query to a data store of the item evaluation server, wherein the search query comprises the skill-specific textual pattern, and wherein the data store contains a plurality of textual patterns;
   matching, by the item evaluation server, the skill-specific textual pattern of the passage with a taxonomy code;
   determining a stored item from the data store of the item evaluation server, wherein the stored item includes the skill-specific textual pattern associated with the taxonomy code of the passage;
   providing, for display at a second object of the GUI, the stored item, wherein the stored item includes annotation of the stored item at the display, wherein the annotation is associated with the taxonomy code, and wherein the annotation comprises an overlay of at least a portion of the stored item based on taxonomy codes and the skill-specific textual pattern;
   generating a test item comprising a test item passage portion based on a portion of the passage having a highest density of the taxonomy codes;
   providing for display at a third object of the GUI, the test item;
   wherein the test item comprises a question and answer based on the passage, a theme of the passage, and the stored item;
   determining, by a trained machine learning item evaluation model, the stored item from the data store, based on the skill-specific textual pattern associated with the taxonomy code of the passage, and weighted contributions of stored item attributes;
   wherein the trained machine learning item evaluation model is trained by:
      determining, by a prediction and learning engine, the stored item based on the skill-specific textual pattern associated with the taxonomy code of the passage, and the weighted contributions of stored item attributes;
      receiving an indication of a relevant stored item from the data store;
      comparing the indication of a relevant stored item to the prediction and learning engine determined stored item; and
      updating the trained machine learning item evaluation model based on the comparison.

2. The method of claim 1, wherein the passage provided for display at the first object of the GUI includes annotation associated with the taxonomy code, and wherein the annotation comprises an overlay of the at least a portion of the passage based on the taxonomy code.

3. The method of claim 2, further comprising:
upon activation of a second trigger at the GUI, providing for display into the first object of the GUI, the passage without the annotation of the passage, wherein activation of the second trigger indicates a request to revert to the display of the passage.

4. The method of claim 1, further comprising:
determining the stored item from the data store, based on a stored item attribute from the data store, wherein the stored item attribute is selected from a group consisting of: a last test date, a question difficulty, a question discriminator, a theme, a scholastic area, or a distractor.

5. The method of claim 1, further comprising:
upon activation of the first trigger, tokenizing, via the item evaluation server, the passage;
determining, with a natural language processing engine of the item evaluation server, a theme of the passage; and
determining the stored item from the data store based on the stored item having the same theme as the passage.

6. The method of claim 1, wherein the skill-specific textual pattern comprises a plurality of skill-specific textual patterns, wherein each skill-specific textual pattern is matched to a respective taxonomy code, and wherein the stored item includes one of the skill-specific textual patterns in the plurality of skill-specific textual pattern.

7. The method of claim 6, further comprising:
upon activation of a third trigger at the GUI indicating a request to select a particular taxonomy code from the at least one taxonomy code, providing for display at the first object of the GUI the passage; and
upon activation of the third trigger at the GUI, providing for display at the second object of the GUI the annotated stored item, wherein the passage and stored item are based on the selected particular taxonomy code.

8. The method of claim 1, wherein the taxonomy codes are selected from a group consisting of: comparative relationship, causal relationship, argument, fact, opinion, reason, judgement, evidence, intent, or theme.

9. A system for generating test items, comprising:
a graphical user interface (GUI);
a data store; and
an item evaluation server, wherein the item evaluation server comprises:
a processor; and
a non-transitory computer readable medium with computer executable instructions embedded thereon, the computer executable instructions configured to cause the processor to:
receive, by the item evaluation server, a passage, wherein the passage comprises a plurality of textual patterns;
provide for display, at a first object of the GUI, at least a portion of the input passage;
upon activation of a first trigger at the GUI, tokenize, via the item evaluation server, the passage to determine a skill-specific passage of a first pretest item, and wherein the skill-specific passage is associated with a test skill, wherein the first trigger is activated by a request to scan or by the item evaluation server;
provide a search query to the data store of the item evaluation server, wherein the search query comprises the skill-specific textual pattern, and wherein the data store contains a plurality of textual patterns;
match, by the item evaluation server, the skill-specific textual pattern of the passage with a taxonomy code;
determine a stored item from the data store of the item evaluation server, wherein the stored item includes the skill-specific textual pattern associated with the taxonomy code of the passage;
provide for display at a second object of the GUI, the stored item, wherein the stored item includes annotation of the stored item at the display, wherein the annotation is associated with the taxonomy code, and wherein the annotation comprises an overlay of at least a portion of the stored item based on taxonomy codes and the textual pattern of the passage;
generating a test item comprising a test item passage portion based on a portion of the passage having a highest density of the taxonomy codes;
providing for display at a third object of the GUI, the test item;
wherein the test item comprises a question and answer based on the passage, a theme of the passage, and the stored item
determine, by a trained machine learning item evaluation model running on a prediction and learning engine, the stored item from the data store, based on the skill-specific textual pattern associated with the taxonomy code of the passage, and weighted contributions of a plurality of stored item attributes; and
train the trained machine learning item evaluation model by:
determining, by the prediction and learning engine, the stored item based on the skill-specific textual pattern associated with the taxonomy code of the passage, and the weighted contributions of stored item attributes;
receiving an indication of a relevant stored item from the data store;
comparing the indication of a relevant stored item to the prediction and learning engine determined stored item; and
updating the trained machine learning item evaluation model based on the comparison.

10. The system of claim 9, wherein the passage for display at the first object of the GUI includes annotation associated with the taxonomy code, and wherein the annotation comprises an overlay of at least a portion of the passage based on the taxonomy code.

11. The system of claim 10, wherein the computer executable instructions are further configured to cause the processor to:
upon activation of a second trigger at the GUI, provide for display into the first object of the GUI, at least a portion of the passage without the annotation of the passage, wherein activation of the second trigger indicates a request to revert to display of passage.

12. The system of claim 9, wherein the computer executable instructions are further configured to cause the processor to:
determine the stored item from the data store, based on a stored item attribute from the data store, wherein the stored item attribute is selected from a group consisting of: a last test date, a question difficulty, a question discriminator, theme, scholastic area, or distractor.

13. The system of claim 9, wherein the evaluation server further comprises a natural language processing engine, and wherein, the computer executable instructions are further configured to cause the processor to:

upon activation of the first trigger, tokenize, by the item evaluation server, the passage and determine, with the natural language processing engine of the item evaluation server, a theme of the passage; and determine the stored item from the data store based on the stored item having the same theme as the passage.

14. The system of claim 9, wherein the skill-specific textual pattern comprises a plurality of skill-specific textual pattern, and wherein the computer executable instructions are further configured to cause the processor to:

match each skill-specific textual pattern to a respective taxonomy code, wherein the stored item includes one of the skill-specific textual patterns in the plurality of skill-specific textual patterns;

determine the stored item from the data store based on the stored item having the same theme as the passage determine, via a natural language processing engine, a theme of the passage; and select the stored item based on the selected theme.

15. The system of claim 14, wherein the computer executable instructions are further configured to cause the processor to:

upon activation of a third trigger at the GUI indicating a request to select a particular taxonomy code from the at least one taxonomy code, provide for display at the first object the passage, and upon activation of the third trigger at the GUI, provide for display at the second object the annotated stored item, wherein the annotated first and stored items comprise respective overlays based on the user selected taxonomy code.

16. The system of claim 9, wherein the computer executable instructions are further configured to cause the processor to match a taxonomy code to the textual pattern, the taxonomy code selected from a group consisting of: comparative relationship, causal relationship, argument, fact, opinion, reason, judgement, evidence, intent, or theme.

* * * * *